United States Patent
Wang

(10) Patent No.: US 6,853,724 B2
(45) Date of Patent: *Feb. 8, 2005

(54) CASCADE LOW-PASS FILTER TO IMPROVE XDSL BAND ATTENUATION FOR POTS SPLITTER

(75) Inventor: Jie Dong Wang, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 64 days.

This patent is subject to a terminal disclaimer.

(21) Appl. No.: 10/119,485

(22) Filed: Apr. 10, 2002

(65) Prior Publication Data

US 2003/0112960 A1 Jun. 19, 2003

Related U.S. Application Data

(63) Continuation-in-part of application No. 10/017,353, filed on Dec. 14, 2001.

(51) Int. Cl.[7] .............................. H04M 1/00; H04M 9/00
(52) U.S. Cl. .......................... 379/387.02; 379/387.02; 379/399.01; 379/399.02; 379/398; 379/413.02; 379/413.03; 379/413.04
(58) Field of Search .................. 379/399.01, 387.01

(56) References Cited

U.S. PATENT DOCUMENTS

| | | | |
|---|---|---|---|
| 4,447,679 A | 5/1984 | Kojima et al. | |
| 4,620,069 A | 10/1986 | Godwin et al. | |
| 4,766,402 A | 8/1988 | Crane | |
| 4,791,659 A | 12/1988 | Ross | |
| 4,823,383 A | 4/1989 | Cardot et al. | |
| 5,195,232 A | 3/1993 | Frederick | |
| 5,528,630 A | 6/1996 | Ashley et al. | |
| 5,539,820 A | 7/1996 | Pistilli | |
| 5,559,854 A | 9/1996 | Suzuki | |
| 5,598,455 A | 1/1997 | Bliven et al. | |
| 5,623,543 A | 4/1997 | Cook | |
| 5,757,803 A | 5/1998 | Russell et al. | |
| 5,764,727 A | 6/1998 | Toumani et al. | |
| 5,883,941 A | 3/1999 | Akers | |
| 5,956,385 A | 9/1999 | Soto et al. | |

(List continued on next page.)

FOREIGN PATENT DOCUMENTS

| | | |
|---|---|---|
| EP | 0317852 | 5/1989 |
| EP | 0814620 | 12/1997 |
| EP | 0891067 | 1/1999 |
| EP | 0909102 | 4/1999 |
| EP | 0923221 | 6/1999 |
| EP | 1117217 | 7/2001 |

OTHER PUBLICATIONS

Budak, ARAM, Passive and Active Network Analysis and Synthesis, Page(s) 543–545, Publisher: Houghton Mifflin Company, Published in: Boston, MA. 1974.

Williams, Electronic Filter Design, , vol. Chapter 3, No. 3–1 to 3–7, Publisher: McGraw–Hill Book Company, Published in: Chapter 8, 8–9 to 9–20, 1981.

Primary Examiner—F. W. Isen
Assistant Examiner—Ramnandan Singh
(74) Attorney, Agent, or Firm—Fogg and Associates, LLC; Jon M. Powers

(57) ABSTRACT

Cascade low-pass filters are useful in attenuating the xDSL band in a POTS splitter. The design of the low-pass filter is a sixth-order filter having two stages. A first stage includes a fourth-order filter, preferably with a stop-band frequency of approximately 48 kHz. A second stage includes a second-order filter in cascade with the fourth-order filter. For this filter, the stop-band frequency is preferably approximately 29 kHz. The inductance value of the second stage is relatively small in comparison to the inductance values of the first stage. In this manner, improvements in xDSL band attenuation are facilitated with little or no eroding of the voice band performance such as insertion loss, pass-band attenuation and return loss.

40 Claims, 6 Drawing Sheets

U.S. PATENT DOCUMENTS

| | | | |
|---|---|---|---|
| 5,974,139 | A | 10/1999 | McNamara et al. |
| 6,067,316 | A | 5/2000 | Amrany et al. |
| 6,069,899 | A | 5/2000 | Foley |
| 6,137,880 | A | 10/2000 | Bella |
| 6,144,399 | A | 11/2000 | Manchester et al. |
| 6,144,735 | A | 11/2000 | Bella |
| 6,178,080 | B1 | 1/2001 | Wilken et al. |
| 6,192,109 | B1 | 2/2001 | Amrany et al. |
| 6,201,227 | B1 | 3/2001 | Tomita |
| 6,208,637 | B1 | 3/2001 | Eames |
| 6,259,676 | B1 | 7/2001 | Kellock et al. |
| 6,278,769 | B1 | 8/2001 | Bella |
| 6,282,204 | B1 | 8/2001 | Balatoni et al. |
| 6,285,754 | B1 | 9/2001 | Sun et al. |
| 6,295,343 | B1 | 9/2001 | Hjartarson et al. |
| 6,298,037 | B1 | 10/2001 | Sharifi |
| 6,301,337 | B1 | 10/2001 | Scholtz et al. |
| 6,314,102 | B1 | 11/2001 | Czerwiec et al. |
| 6,324,212 | B1 | 11/2001 | Jenness |
| 6,373,923 | B1 | 4/2002 | Williamson et al. |
| 6,424,627 | B1 | 7/2002 | Sorhaug et al. |
| 6,470,046 | B1 | 10/2002 | Scott |
| 6,477,238 | B1 | 11/2002 | Schneider et al. |
| 6,496,566 | B1 | 12/2002 | Posthuma |
| 6,532,216 | B1 | 3/2003 | Tennyson |
| 6,574,309 | B1 | 6/2003 | Chea, Jr. et al. |
| 6,584,148 | B1 | 6/2003 | Zitting et al. |
| 6,621,831 | B1 | 9/2003 | Linz |
| 2001/0033650 | A1 | 10/2001 | Wilson et al. |

CASCADE LOW-PASS FILTER TO IMPROVE XDSL BAND ATTENUATION FOR POTS SPLITTER

RELATED APPLICATION

This application is a continuation-in-part of U.S. patent application Ser. No. 10/017,353 filed Dec. 14, 2001 and commonly assigned, the entire contents of which are incorporated by reference herein.

TECHNICAL FIELD OF THE INVENTION

The present invention relates generally to telecommunications, and in particular to low-pass filters for use in POTS splitters and xDSL modems.

BACKGROUND OF THE INVENTION

A variety of telecommunication systems utilize traditional telephone company local subscriber loops to carry high rate digital transmissions. Examples include a variety of digital subscriber loop (DSL) services, such as high-rate DSL (HDSL), asymmetric DSL (ADSL), very high-rate DSL (VDSL) and others. The varieties of DSL service will be referred to herein generally as xDSL.

The xDSL services share the same carrier with traditional analog telephony, commonly referred to as plain old telephone service (POTS). To share the same carrier, some sort of multiplexing is used. Typically, this involves frequency division multiplexing (FDM). POTS typically occupies the frequencies of between 300 and 3400 Hz while the xDSL service typically occupies some band of frequencies above the POTS service.

To isolate the POTS service from the xDSL transceiver, a splitter, or POTS splitter, is used. These splitters generally have a low-pass filter to permit passing of the POTS service and a high-pass filter to permit passing of the xDSL service. To provide maximum possible transfer of power of a signal between a source and its load, the POTS splitter must have its impedance matched to the transmission line or carrier.

For the reasons stated above, and for other reasons stated below that will become apparent to those skilled in the art upon reading and understanding the present specification, there is a need in the art for alternative apparatus and methods to facilitate line impedance matching in a POTS splitter.

SUMMARY

The various embodiments utilize resistance in parallel with one or more inductors in a series leg of a low-pass filter. This parallel resistance facilitates changes to the input and output resistance of the filter with little or no change in the reactance of the inductors. Furthermore, the reactance of the capacitors in the shunt legs of the filter will be substantially unaffected. This assists the designer in matching the impedance of the filter in the pass-band while still providing substantial impedance mismatching in the stop-band without substantially affecting the characteristics of the filter. Facilitating impedance matching in the pass-band and impedance mismatching in the stop-band is accomplished without the need for more complex active components. Various embodiments may further contain additional components that do not materially affect the basic and novel properties of the devices disclosed herein.

The various embodiments include sixth-order elliptic low-pass filters and POTS splitters including such filters of varying scope. The design of the sixth-order filter comprises two stages. A first stage includes a fourth-order filter, preferably with a stop-band frequency of approximately 48 kHz. A second stage includes a second-order filter in cascade with the fourth-order filter. For this filter, the stop-band frequency is preferably approximately 29 kHz. The inductance value of the second stage is relatively small in comparison to the inductance values of the first stage. In this manner, improvements in xDSL band attenuation are facilitated with little or no eroding of the voice band performance such as insertion loss, pass-band attenuation and return loss.

DETAILED DESCRIPTION

Figure 1:
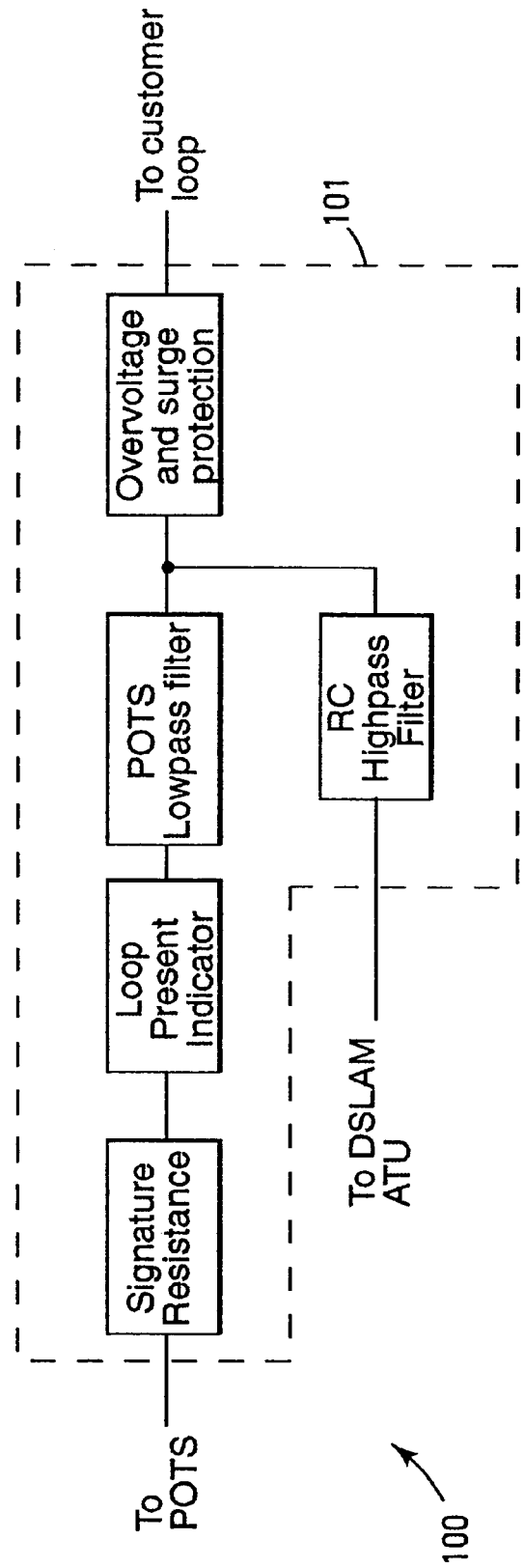
FIG. 1 is a block diagram of a communication network having a POTS splitter in accordance with an embodiment of the invention.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, electrical or mechanical changes may be made without departing from the scope of the present invention. The following detailed description is, therefore, not to be taken in a limiting sense, and the scope of the present invention is defined only by the appended claims and equivalents thereof.

Impedance matching is necessary in the design of POTS splitters to provide the maximum possible transfer of signal power between a source and its load. Mismatched impedance in the transmission line can cause signal reflection, echo return and power loss. The maximum transfer power of a signal, from a source to its load, occurs when load impedance is equal to the complex conjugate of the source impedance. In other words, the impedance of source and load have the same real part and opposite reactance.

However, the designer generally does not have the ability to change the filter input and output impedance by changing the values of impedance (L) and capacitance (C) when the coefficient of the filter is calculated. Changing the values of L and C in the filter will change the cutoff frequency and attenuation of frequency response of the filter. Modifications of the input and output impedance can be accomplished using active filtering, but such complexity can lead to higher failure rates of installed splitters. Moreover, the use of active circuits in the filter can interfere with lifeline POTS support. Such lifeline POTS service is generally required by telephony companies for emergency access of the telecommunications system.

For one embodiment, filter impedance is modified by adding parallel resistors with one or more inductors in the series leg of the filter. This changes input and output resistance of a filter without changing the reactance of the inductors in the series leg if the quality, Q, is greater than 10. If Q is less than 10, reactance of the inductors will see little change. Furthermore, the reactance of the capacitors in the shunt legs of the filter will be substantially unaffected. Therefore, it will generally not change the characteristics of the filter to add parallel resistors to the inductors.

The various embodiments help facilitate impedance matching in a POTS splitter for the pass-band of the low-pass filter portion while facilitating impedance mismatching in the stop-band of the low-pass filter. Various embodiments include one or two pairs of resistors in parallel with differential mode inductors in a sixth-order elliptic low-pass filter. By transforming a parallel circuit into the equivalent series resistor and inductance circuit, several tens of ohms resistance can be added to the splitter in the passband to improve line impedance matching and several kilo-ohms resistance can be added to the splitter in the stop-band to accelerate the impedance mismatching. The circuit sees an effective filter resistance that is larger than what is actually present. This allows fine tuning of the insertion loss, return loss and voice band attenuation due to the change of line impedance matching. It also accelerates the impedance mismatching in the xDSL band to improve attenuation. In addition, the network's quality factor, Q, can be decreased, gain overshoot in the frequency response can be reduced and bandwidth can be increased through proper selection of the parallel resistance values.

FIG. 1 is a block diagram of a communication network 100 having a POTS splitter 101 coupled between a customer loop, or local loop carrier, and a central office (CO) POTS transceiver and DSL transceiver, such as a DSL access multiplexer (DSLAM) ADSL transceiver unit (ATU). The primary components of the POTS splitter 101 include the CO POTS low-pass filter and the RC high-pass filter. Typically, the POTS splitter 101 would contain only the capacitive portion of the high-pass filter, relying on modem circuitry to provide the resistive portion. Additional circuitry may include overvoltage and surge protection, a loop present indicator and a signature resistance for a CO-side application. The POTS splitter 101 includes a low-pass filter in accordance with an embodiment of the invention.

Figure 2:
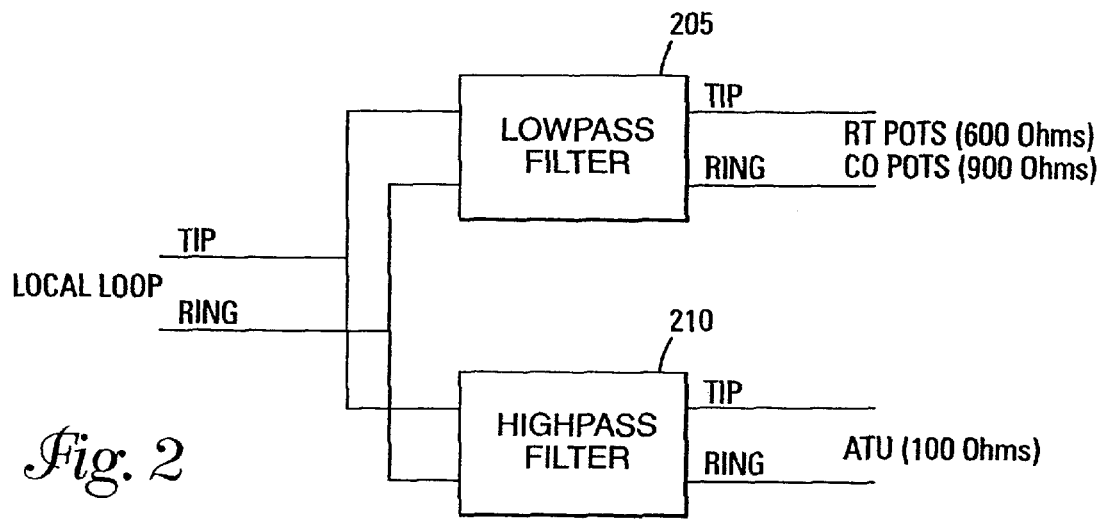
FIG. 2 is a block diagram of a POTS splitter showing additional detail on the connections between the various carriers in accordance with an embodiment of the invention.

FIG. 2 is a block diagram of a POTS splitter 101 showing additional detail on the connections between the various carriers. The POTS splitter 101 of FIG. 2 includes a low-pass filter 205, in accordance with an embodiment of the invention, having a tip line from the CO (central office) or RT (remote terminal) coupled to a tip line of the local loop and a ring line from the CO or RT coupled to a ring line of the local loop. The POTS splitter 101 of FIG. 2 further includes a tip line from the ATU coupled to the tip line of the local loop and a ring line from the ATU coupled to the ring line of the local loop. For POTS systems in North America, the tip and ring lines generally present a characteristic impedance of approximately 900 Ω for incoming signals and approximately 600 Ω or less for the return signals. The ATU will typically present a characteristic impedance of approximately 100 Ω. A POTS splitter is utilized at each loop termination, i.e., two per loop. As POTS termination impedance values are generally different at each point, the low-pass filters of the POTS splitters should also be different for each termination.

Figure 3:
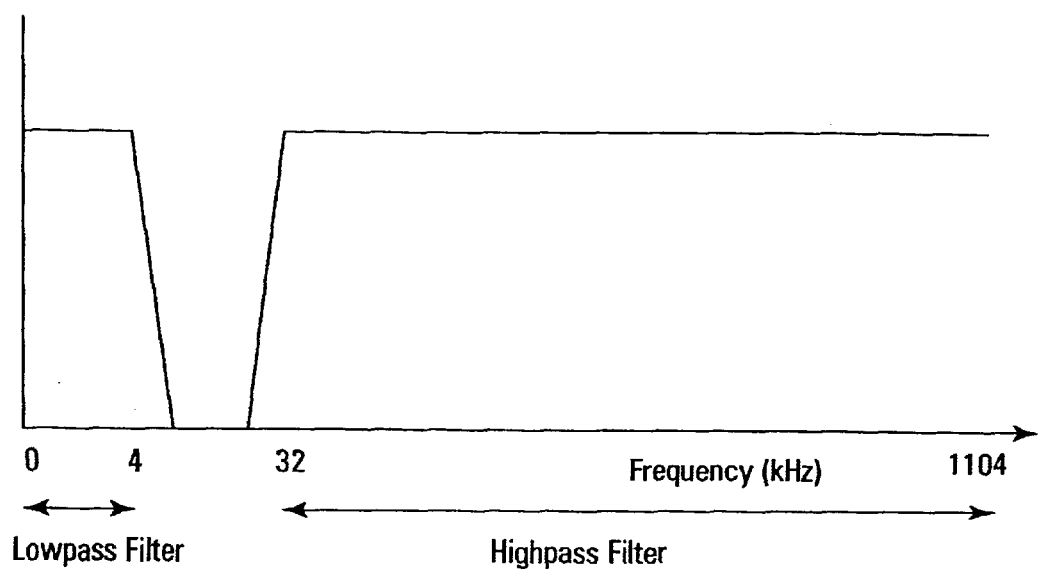
FIG. 3 is a graph depicting the pass-bands and stop-band generally used for a POTS splitter.

FIG. 3 is a graph depicting the pass-bands and stop-band generally used for a POTS splitter 101. The low-pass filter has a pass-band of approximately 0–4 kHz while the high-pass filter has a pass-band of approximately 32 kHz and above. The stop-band for the low-pass filter is generally anything above its pass-band, particularly 32 kHz or above, while the stop-band for the high-pass filter is generally anything below its pass-band, particularly 4 kHz or below.

Figure 4A:
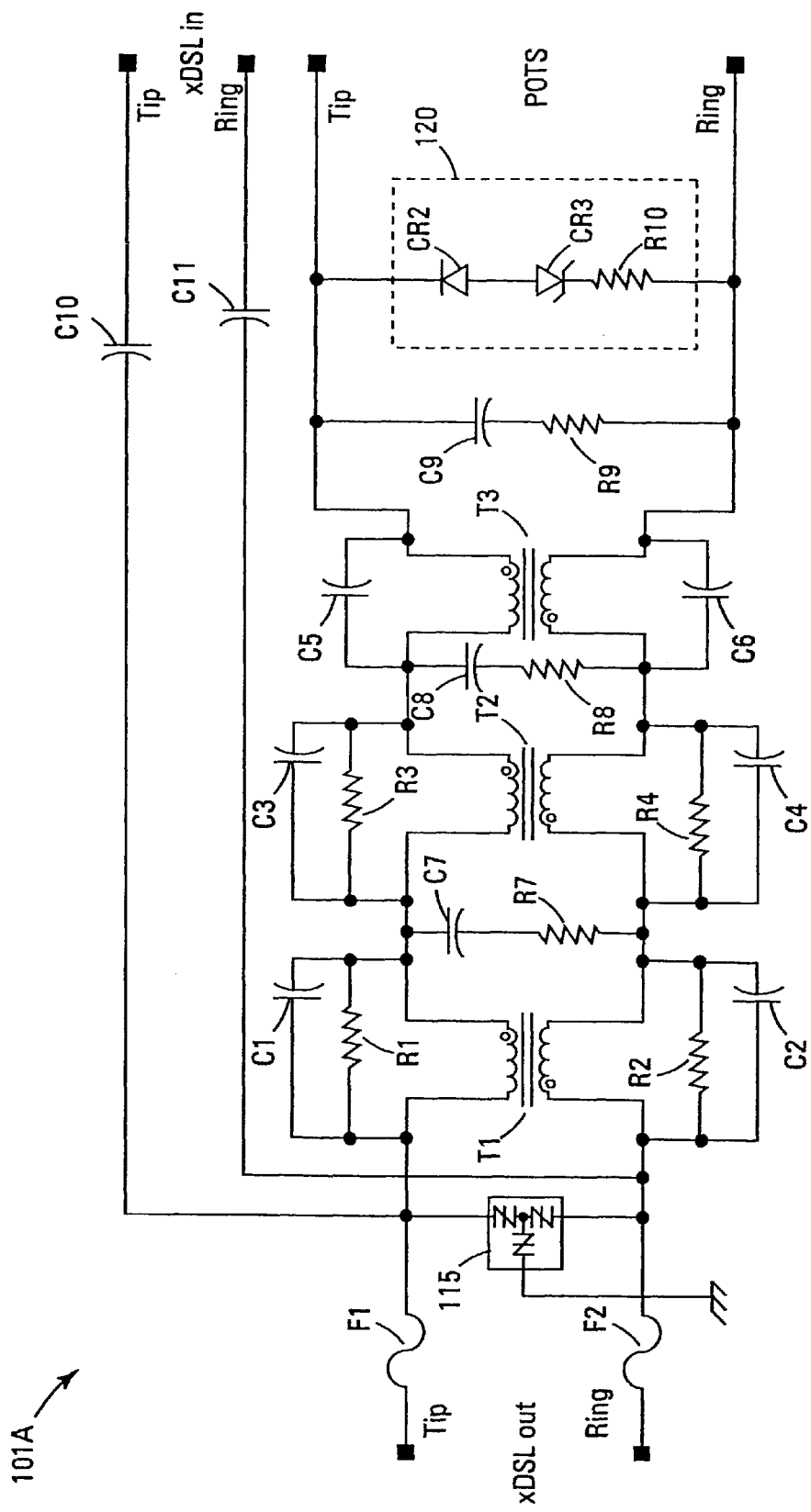
FIGS. 4A–4B are schematics of POTS splitters in accordance with embodiments of the invention.

FIG. 4A is a schematic of a POTS splitter 101A in accordance with an embodiment of the invention. The POTS splitter 101A of FIG. 4A includes a high-pass filter including capacitors C10 and C11 coupled between the ring and tip lines, respectively, of an xDSL in port, e.g., the CO ATU or other DSL transceiver, and an xDSL out port, e.g., the local loop. As noted earlier, the high-pass filter can further include resistive components (not shown) in an associated modem circuit. The POTS splitter 101A may further include a solid state voltage suppressor 115 or other over-voltage suppression circuitry coupled between the ring and tip lines of the xDSL out port. The POTS splitter 101A may include circuitry 120 coupled between the ring and tip lines of a POTS port, e.g., a CO POTS transceiver, for providing loop presence indication and signature resistance. For one embodiment, the circuitry 120 includes series-connected diode CR2, zener diode or regulator CR3 and resistor R10. Fuses F1 and F2 may be inserted in the tip and ring lines, respectively, for further surge protection. For example, F1 and F2 may represent 1.5A fuses.

The POTS splitter 101A of FIG. 4A further includes a low-pass filter including series-connected differential mode inductors T1, T2 and T3. For one embodiment, inductors T1, T2 and T3 have inductance values in the range of approximately 2 mH to approximately 30 mH. For one example embodiment, the inductor T1 has an inductance value of approximately 18 mH, the inductor T2 has an inductance value of approximately 22 mH and the inductor T3 has an inductance value of approximately 2.8 mH.

The low-pass filter is a sixth-order elliptic low-pass filter. Inductor T1 is further coupled to resistors R1 and R2, which are coupled across the tip lines and ring lines, respectively. The resistors R1 and R2 are in parallel with separate windings of the inductor T1. Inductor T1 is further coupled to capacitors C1 and C2, which are coupled across the tip lines and ring lines, respectively. The capacitors C1 and C2 are in parallel with the resistors R1 and R2, respectively.

Inductor T2 is coupled to resistors R3 and R4, which are coupled across the tip lines and ring lines, respectively. The resistors R3 and R4 are in parallel with separate windings of the inductor T2. Inductor T2 is further coupled to capacitors C3 and C4, which are coupled across the tip lines and ring lines, respectively. The capacitors C3 and C4 are in parallel with the resistors R3 and R4, respectively.

Inductor T3 is coupled to capacitors C5 and C6, which are coupled across the tip lines and ring lines, respectively. The capacitors C5 and C6 are in parallel with separate windings of the inductor T3. The resistors R1, R2, R3 and R4 may be used to fine tune the filter resistance to improve impedance matching with line and load termination.

For one embodiment, the parallel resistor R1 and the parallel resistor R2 have substantially the same resistance. For a further embodiment, the parallel resistor R3 and the parallel resistor R4 have substantially the same resistance. For a still further embodiment, the parallel resistors R1 and R2 each have a lower resistance value than the parallel resistors R3 and R4. For one embodiment, the parallel resistors R1 and R2 have resistance values greater than approximately 1 kΩ. For a further embodiment, the parallel resistors R1 and R2 further have resistance values less than approximately 5 kΩ. For one embodiment, the parallel resistors R3 and R4 have resistance values greater than approximately 5 kΩ. For a further embodiment, the parallel resistors R3 and R4 further have resistance values less than or equal to approximately 30 kΩ. For a still further embodiment, the parallel resistors R3 and R4 effectively prohibit current flow, e.g., through increasing values of resistance or elimination of the resistors altogether. In one example embodiment, parallel resistors R1 and R2 may have resistance values of approximately 3.01 kΩ and the parallel resistors R3 and R4 may have resistance values of approximately 5.62 kΩ.

For one embodiment, the parallel capacitors C1 and C2 have substantially the same capacitance. For another embodiment, the parallel capacitors C3 and C4 have substantially the same capacitance. For still another embodiment, the parallel capacitors C5 and C6 have substantially the same capacitance. For one embodiment, the parallel capacitors C1 and C2 have capacitance values of approximately one order of magnitude less than the capacitance values of the parallel capacitors C3 and C4. For another embodiment, the parallel capacitors C1 and C2 are eliminated. For yet another embodiment, the parallel capacitors C5 and C6 have capacitance values of approximately one order of magnitude more than the capacitance values of the parallel capacitors C3 and C4. For one example embodiment, the parallel capacitors C1 and C2 have capacitance values of approximately 200 pF, the parallel capacitors C3 and C4 have capacitance values of approximately 0.002 μF and the parallel capacitors C5 and C6 have capacitance values of approximately 0.016 μF.

Shunt legs may be inserted between the tip and ring lines of the low-pass filter. For one embodiment, shunt capacitor C7 may be interposed between the inductor T1 and the inductor T2 and coupled between the tip and ring lines, e.g., between the separate windings of the inductors T1 and T2. A resistor R7 may be coupled between the tip and ring lines in series with the capacitor C7. For a further embodiment, shunt capacitor C8 may be interposed between the inductor T2 and the inductor T3 and coupled between the tip and ring lines, e.g., between the separate windings of the inductors T2 and T3. A resistor R8 may be coupled between the tip and ring lines in series with the capacitor C8. For a still further embodiment, shunt capacitor C9 may be interposed between the inductor T3 and the POTS port and coupled between the tip and ring lines, e.g., between the windings of the inductor T3. A resistor R9 may be coupled between the tip and ring lines in series with the capacitor C9.

For one embodiment, the resistors R7, R8 and R9 have resistance values of approximately 100 Ω or less. For another embodiment, the shunt capacitors C7, C8 and C9 have capacitance values of approximately 0.05 μF or less. For one example embodiment, the resistors R7, R8 and R9 each have resistance values of approximately 100 Ω while shunt capacitor C7 has a capacitance value of approximately 0.010 μF, shunt capacitor C8 has a capacitance value of approximately 0.030 μF, and shunt capacitor C9 has a capacitance value of approximately 0.022 μF.

Figure 4B:
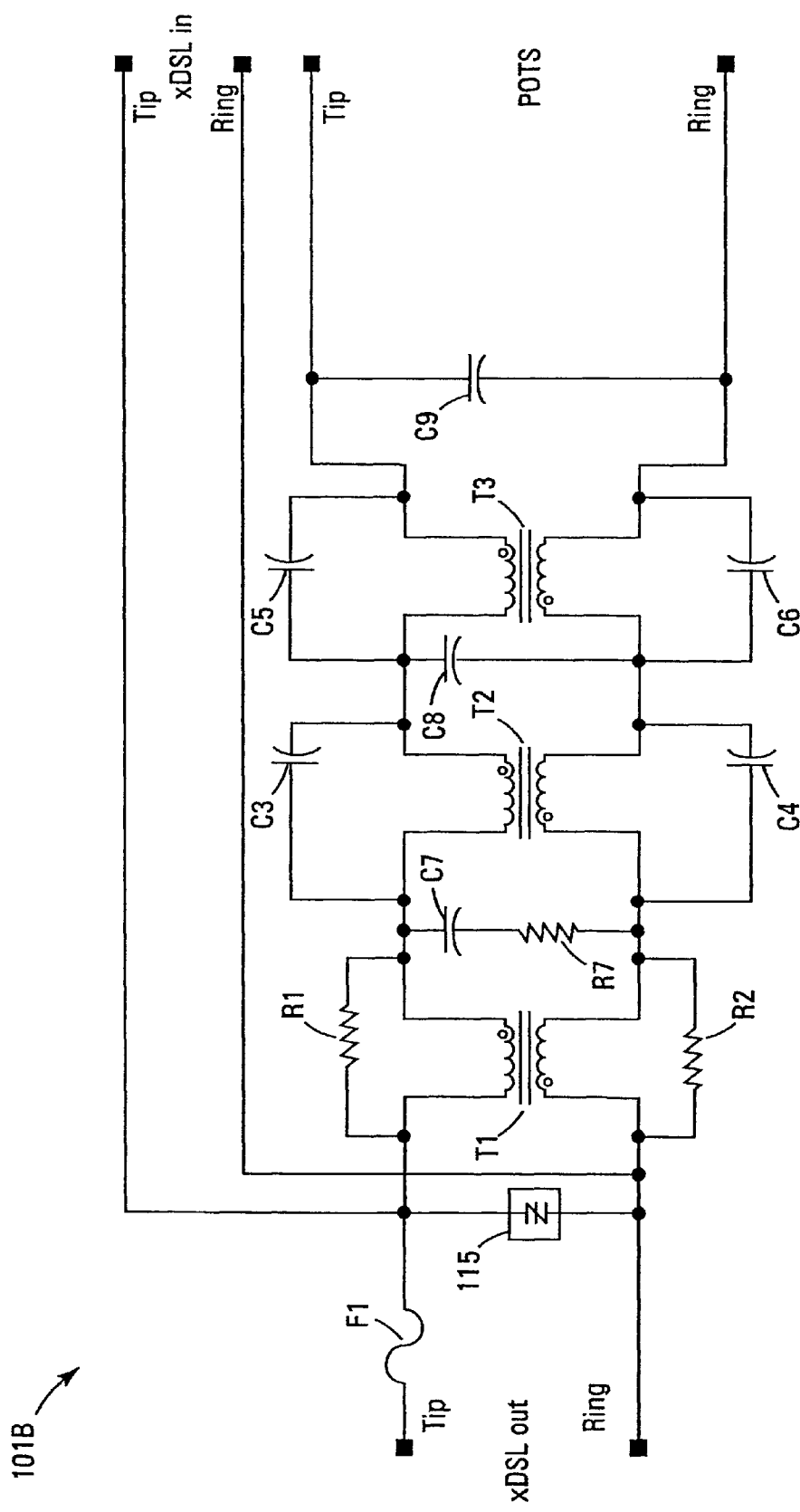

FIG. 4B is a schematic of a POTS splitter 101B in accordance with another embodiment of the invention as an example of a splitter for a remote-side modem. The POTS splitter 101B is shown without the high-pass filter as both the resistive and capacitive components may reside as part of the modem. The POTS splitter 101B may include a solid state voltage suppressor 115 or other over-voltage suppression circuitry coupled between the ring and tip lines of the xDSL out port. A fuses F1 may be inserted in the tip or ring line for further surge protection. For example, F1 may represent a 1.5A fuse. The signature resistance and loop presence indication may also be eliminated from a low-pass filter for a remote-side modem.

The POTS splitter 101B of FIG. 4B further includes a low-pass filter including series-connected differential mode inductors T1, T2 and T3. For one embodiment, the inductors T1, T2 and T3 have inductance values in the range of approximately 2 mH to approximately 25 mH. For one example embodiment, the inductor T1 has an inductance value of approximately 21 mH, the inductor T2 has an inductance value of approximately 10 mH and the inductor T3 has an inductance value of approximately 2.8 mH.

Inductor T1 is further coupled to resistors R1 and R2, which are coupled across the tip lines and ring lines, respectively. The resistors R1 and R2 are in parallel with separate windings of the inductor T1. Inductor T2 is coupled to capacitors C3 and C4, which are coupled across the tip lines and ring lines, respectively.

Inductor T3 is coupled to capacitors C5 and C6, which are coupled across the tip lines and ring lines, respectively. The capacitors C5 and C6 are in parallel with separate windings of the inductor T3. The resistors R1 and R2 may be used to fine tune the filter resistance to improve impedance matching with line and load termination.

For one embodiment, the parallel resistor RI and the parallel resistor R2 have substantially the same resistance. For a further embodiment, the parallel resistors R1 and R2 have resistance values greater than approximately 1 kΩ. For a further embodiment, the parallel resistors R1 and R2 further have resistance values less than approximately 5 kΩ. In one example embodiment, parallel resistors R1 and R2 may have resistance values of approximately 2.37 kΩ.

For one embodiment, the parallel capacitors C3 and C4 have substantially the same capacitance. For still another embodiment, the parallel capacitors C5 and C6 have substantially the same capacitance. For one embodiment, the parallel capacitors C5 and C6 have capacitance values of approximately one order of magnitude more than the capacitance values of the parallel capacitors C3 and C4. For one example embodiment, the parallel capacitors C3 and C4 have capacitance values of approximately 0.0022 μF and the parallel capacitors C5 and C6 have capacitance values of approximately 0.022 μF.

Shunt legs may be inserted between the tip and ring lines of the low-pass filter. For one embodiment, shunt capacitor C7 may be interposed between the inductor T1 and the inductor T2 and coupled between the tip and ring lines, e.g., between the separate windings of the inductors T1 and T2. A resistor R7 may be coupled between the tip and ring lines in series with the capacitor C7. For a further embodiment, shunt capacitor C8 may be interposed between the inductor T2 and the inductor T3 and coupled between the tip and ring lines, e.g., between the separate windings of the inductors T2 and T3. For a still further embodiment, shunt capacitor C9 may be interposed between the inductor T3 and the POTS port and coupled between the tip and ring lines, e.g., between the windings of the inductor T3.

For one embodiment, the resistor R7 has a resistance value of approximately 100 Ω or less. For another embodiment, the shunt capacitors C7, C8 and C9 have capacitance values of approximately 0.05 μF or less. For one example embodiment, the resistor R7 has a resistance value of approximately 51.1 Ω while shunt capacitor C7 has a capacitance value of approximately 0.022 μF, shunt capacitor C8 has a capacitance value of approximately 0.036 μF, and shunt capacitor C9 has a capacitance value of approximately 0.01 μF.

Figure 5A:
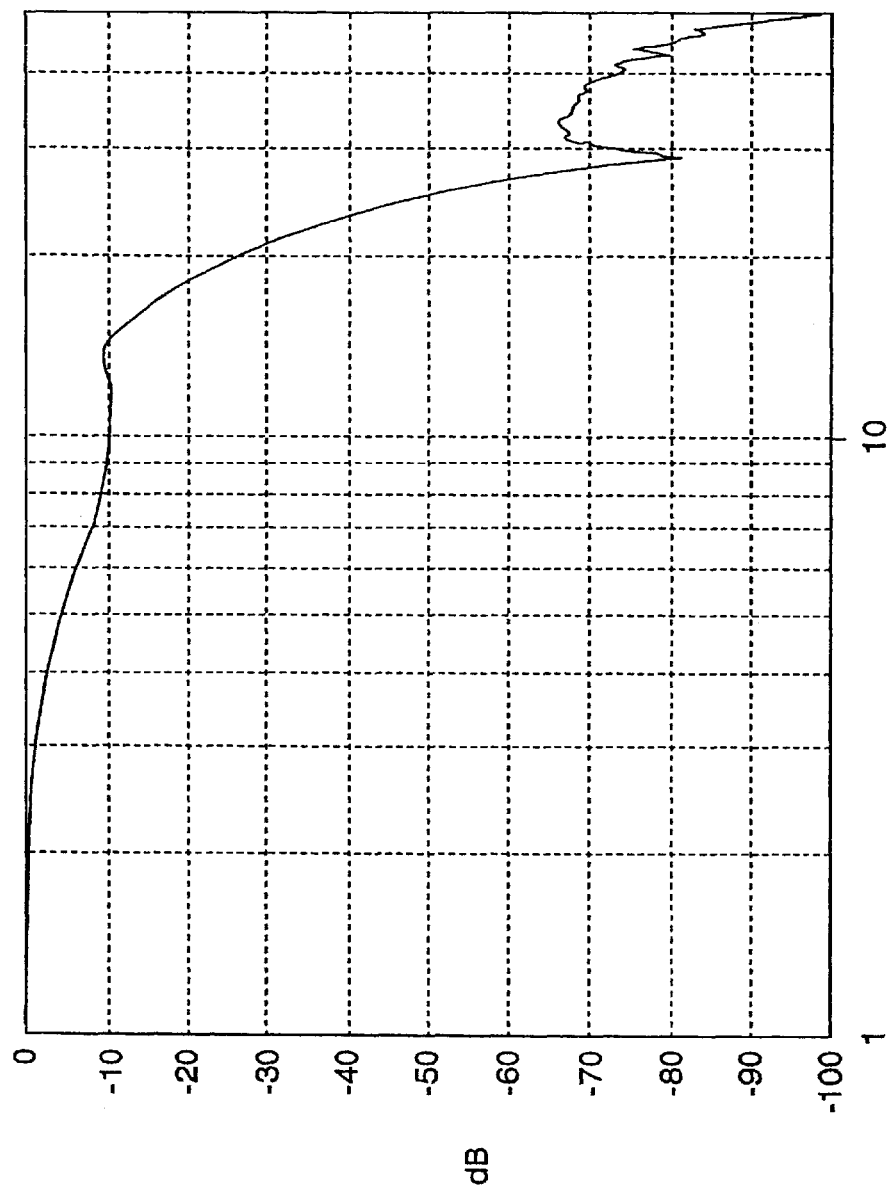
FIGS. 5A–5B are graphs of a frequency response for a POTS splitter in accordance with one embodiment of the type depicted in FIG. 4B.
Figure 5B:
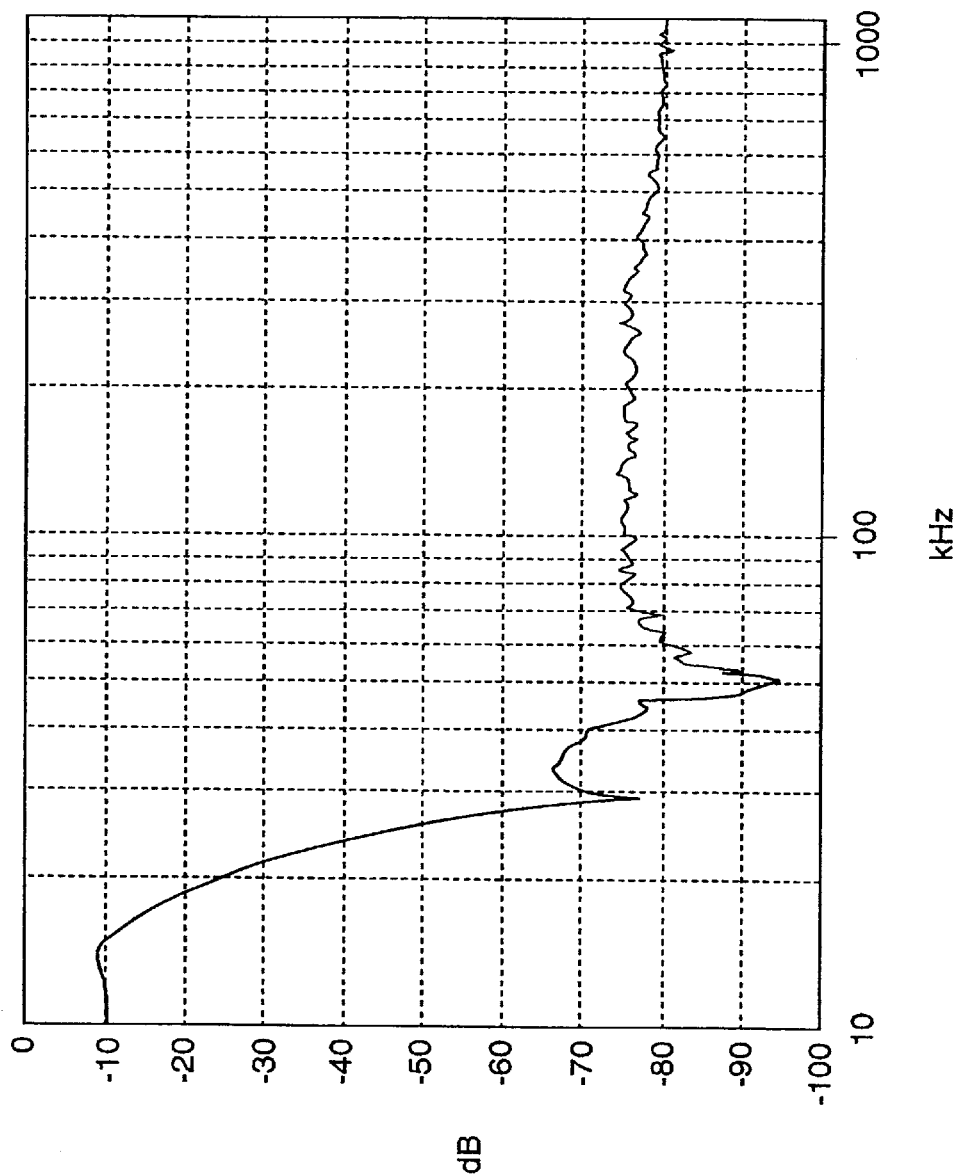

The low-pass filter of FIG. 4B is a sixth-order elliptic low-pass filter. The design of the sixth-order filter includes two stages. A first stage is a fourth-order filter between xDSL out and the second shunt leg (including the second shunt leg). For one embodiment, this first stage has a stop-band frequency of approximately 48 kHz. The stop-band frequency is determined by the capacitance of capacitors C3 and C4 and the inductance of inductor T2. The filter frequency response of such an embodiment exhibits a notch at approximately 48 kHz as shown in FIG. 5. At and above 48 kHz for this fourth-order filter, the attenuation may exceed 65 dB. Generally, losses erode the pass-band performance more rapidly than the stop-band performance if the stop-band frequency is moved closer to 30 kHz by changing the values of C3, C4 and T2. For one embodiment, the attenuation at 32 kHz to 300 kHz is at least 65 dB. A second stage includes a second-order filter in cascade with the fourth-order filter. For this filter, the stop-band frequency is approximately 29 kHz and is determined by the capacitance of capacitors C5 and C6 and the inductance of inductor T3. The filter frequency response of FIG. 5 exhibits a notch at approximately 29 kHz corresponding to this second stage. Since the inductance of T3 is relatively small in comparison to the inductance of T1 and T2, this greatly improves the xDSL band attenuation with little or no eroding of the voice band performance such as insertion loss, pass-band attenuation and return loss. For one embodiment, the inductance value of the inductor T3 is less than half of the inductance value of the inductor T1 or the inductor T2. For a further embodiment, the inductance value of the inductor T3 is less than approximately 30% of the inductance value of the inductor T1 or the inductor T2.

Mismatched impedance in the transmission line causes signal reflection, echo return and power loss. The maximum transfer of power of a signal from a source to its load occurs when load impedance is equal to the complex conjugate of the source impedance. In other words, the impedance of the source and load should have the same real part and opposite reactance.

For North American telephony systems, the POTS splitter generally needs to pass frequencies up to 3.4 kHz with less than 0.75 dB for long loop and 1.00 dB for short loop insertion loss at 1 kHz and to attenuate at least 65 dB at a frequency range of 32 kHz to 300 kHz and 55 dB at a frequency range of 300 kHz to 1104 kHz according to the ANSI T1.413 standard. Such standards also require voice band attenuation at 0.2 to 3.4 kHz of +1.5 dB to −1.5 dB for short loop and of +0.5 dB to −1.5 dB for long loop. Such standards also require voice band attenuation at 3.4 to 4 kHz of +2.0 dB to −2.0 dB for short loop and of +1.0 dB to −1.5 dB for long loop. For RT-side applications, attenuation should be greater than 6 dB for echo return loss (ERL), and greater than 5 dB for singing return loss low (SRL-L) and 3 dB for singing return loss high (SRL-H). For CO-side applications, attenuation should be greater than 8 dB for ERL, and greater than 5 dB for SRL-L and 5 dB for SRL-H.

CONCLUSION

Impedance matching is necessary in the design of POTS splitters to provide the maximum possible transfer of signal power between a source and its load. Mismatched impedance in the transmission line can cause signal reflection, echo return and power loss. The maximum transfer power of a signal, from a source to its load, occurs when load impedance is equal to the complex conjugate of the source impedance. In other words, the impedance of source and load have the same real part and opposite reactance.

The various embodiments utilize resistance in parallel with the series leg of the low-pass filter. This parallel resistance facilitates changes to the input and output resistance of the filter with little or no change in the reactance of the inductors. Furthermore, the reactance of the capacitors in the shunt legs of the filter will be substantially unaffected. This assists the designer in matching the impedance of the filter in the pass-band while still providing substantial impedance mismatching in the stop-band without substantially affecting the characteristics of the filter. Facilitating impedance matching in the pass-band and impedance mismatching in the stop-band is accomplished without the need for more complex active components. Various embodiments may further contain additional components that do not materially affect the basic and novel properties of the devices disclosed herein.

The various embodiments include sixth-order elliptic low-pass filters and POTS splitters including such filters of varying scope. The design of the sixth-order filter comprises two stages. A first stage includes a fourth-order filter, preferably with a stop-band frequency of approximately 48 kHz. A second stage includes a second-order low-pass filter in cascade with the fourth-order filter. For this filter, the stop-band frequency is preferably approximately 29 kHz. The inductance value of the second stage is relatively small in comparison to the inductance values of the first stage. In this manner, improvements in xDSL band attenuation are facilitated with little or no eroding of the voice band performance such as insertion loss, pass-band attenuation and return loss.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A low-pass filter, comprising:
   a first differential mode inductor in series with a second differential mode inductor and a third differential mode inductor;
   first and second resistors in parallel with the first differential mode inductor;
   first and second capacitors in parallel with the second differential mode inductor;
   third and fourth capacitors in parallel with the third differential mode inductor;
   a first shunt leg interposed between the first and second differential mode inductors and coupled across the first and second differential mode inductors;
   a second shunt leg interposed between the second and third differential mode inductors and coupled across the second and third differential mode inductors; and
   a third shunt leg coupled across the third differential mode inductor.

2. The low-pass filter of claim 1, wherein the low-pass filter is a passive low-pass filter.

3. The low-pass filter of claim 1, wherein the first resistor and the second resistor have substantially the same resistance.

4. The low-pass filter of claim 1, wherein the first capacitor and the second capacitor have substantially the same capacitance.

5. The low-pass filter of claim 1, wherein the third capacitor and the fourth capacitor have substantially the same capacitance.

6. The low-pass filter of claim 1, wherein the first and second capacitors each have capacitance values of approximately one order of magnitude less than capacitance values of the third and fourth capacitors.

7. The low-pass filter of claim 1, wherein the first inductor has an inductance value greater than an inductance value of the second inductor and the second inductor has an inductance value greater than the inductance value of the third inductor.

8. The low-pass filter of claim 7, wherein the third inductor has an inductance value of less than half of the inductance value of the second inductor.

9. The low-pass filter of claim 7, wherein the third inductor has an inductance value of less than approximately 30% of the inductance value of the second inductor.

10. The low-pass filter of claim 7, wherein the first inductor has an inductance value of approximately 21 mH, the second inductor has an inductance value of approximately 10 mH, and the third inductor has an inductance value of approximately 2.8 mH.

11. The low-pass filter of claim 10, wherein the first and second capacitors each have capacitance values of approximately 0.002 $\mu$F, and the third and fourth capacitors each have capacitance values of approximately 0.02 $\mu$F.

12. The low-pass filter of claim 1, wherein the first shunt leg further comprises a fifth capacitor, the second shunt leg further comprises an sixth capacitor and the third shunt leg further comprises a seventh capacitor.

13. The low-pass filter of claim 12, wherein the first shunt leg further comprises a third resistor in series with the fifth capacitor.

14. The low-pass filter of claim 13, further comprising:
an eighth capacitor in parallel with the first resistor;
a ninth capacitor in parallel with the second resistor;
a fourth resistor in parallel with the first capacitor; and
a fifth resistor in parallel with the second capacitor.

15. The low-pass filter of claim 14, wherein the eighth and ninth capacitors have substantially the same capacitance and wherein the fourth and fifth resistors have substantially the same resistance.

16. The low-pass filter of claim 15, wherein the eighth and ninth capacitors each have capacitance values of approximately one order of magnitude less than the capacitance values of the first and second capacitors.

17. The low-pass filter of claim 16, wherein the fourth and fifth resistors each have resistance values greater than the resistance values of the first and second resistors.

18. The low-pass filter of claim 17, wherein the second shunt leg further comprises a sixth resistor in series with the sixth capacitor and wherein the third shunt leg further comprises a seventh resistor in series with the seventh capacitor.

19. A low-pass filter, comprising:
a first differential mode inductor in series with a second differential mode inductor, wherein the first differential mode inductor has an inductance value of approximately 21 mH and wherein the second differential mode inductor has an inductance value of approximately 10 mH;
a third differential mode inductor in series with the second differential mode inductor, wherein the third differential mode inductor has an inductance value of approximately 2.8 mH;
first and second resistors in parallel with the first differential mode inductor, wherein the first and second resistors each have a resistance value of approximately 2.37 k$\Omega$;
first and second capacitors in parallel with the second differential mode inductor, wherein the first and second capacitors each have a capacitance value of approximately 0.0022 $\mu$F;
third and fourth capacitors in parallel with the third differential mode inductor, wherein the third and fourth capacitors each have a capacitance value of approximately 0.022 $\mu$F;
a first shunt leg interposed between the first and second differential mode inductors and coupled across a first and second winding of the first differential mode inductor, wherein the first shunt leg comprises a fifth capacitor having a capacitance value of approximately 0.022 $\mu$F and a third resistor coupled in series with the fifth capacitor and having a resistance value of approximately 51.1 $\Omega$;
a second shunt leg interposed between the second and third differential mode inductors and coupled across a first and second winding of the second differential mode inductor, wherein the second shunt leg comprises a sixth capacitor having a capacitance value of approximately 0.036 $\mu$F; and
a third shunt leg coupled across a first and second winding of the third differential mode inductor, wherein the third shunt leg comprises a seventh capacitor having a capacitance value of approximately 0.010 $\mu$F;
wherein the third differential mode inductor is interposed between the second shunt leg and the third shunt leg.

20. A low-pass filter, comprising:
a fourth-order first stage comprising:
a first differential mode inductor in series with a second differential mode inductor;
first and second resistors in parallel with the first differential mode inductor, wherein the first and second resistors each have approximately the same resistance value;
first and second capacitors in parallel with the second differential mode inductor, wherein the first and second capacitors each have approximately the same capacitance value;
a first shunt leg interposed between the first and second differential mode inductors and coupled across a first and second winding of the first differential mode inductor; and
a second shunt leg interposed between the second and third differential mode inductors and coupled across a first and second winding of the second differential mode inductor;
a second-order second stage in cascade with the first stage, the second stage comprising:
a third differential mode inductor having an inductance value of less than half of an inductance value of the first differential mode inductor or an inductance value of the second differential mode inductor;
third and fourth capacitors in parallel with the third differential mode inductor, wherein the third and fourth capacitors each have approximately the same capacitance value; and
a third shunt leg coupled across a first and second winding of the third differential mode inductor;
wherein the third differential mode inductor is interposed between the second shunt leg and the third shunt leg.

21. The low-pass filter of claim 20, wherein the first stage has a stop-band of approximately 48 kHz and the second stage has a stop-band of approximately 29 kHz.

22. A low-pass filter, consisting essentially of:
   a first differential mode inductor in series with a second differential mode inductor and a third differential mode inductor;
   a first resistor in parallel with a first winding of the first differential mode inductor;
   a second resistor in parallel with a second winding of the first differential mode inductor;
   a first capacitor in parallel with a first winding of the second differential mode inductor;
   a second capacitor in parallel with a second winding of the second differential mode inductor;
   a third capacitor in parallel with a first winding of the third differential mode inductor;
   a fourth capacitor in parallel with a second winding of the third differential mode inductor;
   a first shunt leg comprising a first end coupled between the first windings of the first and second differential mode inductors and a second end coupled between the second windings of the first and second differential mode inductors;
   a second shunt leg comprising a first end coupled between the first windings of the second and third differential mode inductors and a second end coupled between the second windings of the second and third differential mode inductors; and
   a third shunt leg comprising a first end coupled to the first winding of the third differential mode inductor and a second end coupled to the second winding of the third differential mode inductor;
   wherein the third differential mode inductor is coupled between the second and third shunt legs.

23. The low-pass filter of claim 22, wherein the first shunt leg consists essentially of a capacitor in series with a resistor and the second and third shunt legs each consist essentially of a capacitor.

24. A POTS splitter, comprising:
   a low-pass filter for coupling between an xDSL out port and a POTS port, wherein the low-pass filter comprises:
      first, second and third differential mode inductors in series between the POTS port and the xDSL out port;
      first and second resistors in parallel with the first differential mode inductor;
      first and second capacitors in parallel with the second differential mode inductor;
      third and fourth capacitors in parallel with the third differential mode inductor;
      a first shunt leg interposed between the first and second differential mode inductors and coupled across the first and second differential mode inductors;
      a second shunt leg interposed between the second and third differential mode inductors and coupled across the second and third differential mode inductors; and
      a third shunt leg coupled across the third differential mode inductor.

25. The POTS splitter of claim 24, further comprising overvoltage and surge protection coupled between the low-pass filter and the xDSL out port.

26. The POTS splitter of claim 24, further comprising signature resistance and loop presence indication coupled between the low-pass filter and the POTS port.

27. The POTS splitter of claim 24, wherein the low-pass filter has a pass-band of approximately 0–4 kHz and the high-pass filter has a pass-band of approximately 32 kHz and above.

28. The POTS splitter of claim 24, wherein the low-pass filter is a passive low-pass filter.

29. The POTS splitter of claim 24, further comprising a high-pass filter for coupling between an xDSL in port and the xDSL out port.

30. The POTS splitter of claim 29, wherein the high-pass filter is an RC filter.

31. The POTS splitter of claim 29, wherein the high-pass filter comprises a capacitor coupled between a tip line of the xDSL in port and the xDSL out port and a capacitor coupled between a ring line of the xDSL in port and the xDSL out port.

32. The POTS splitter of claim 24, wherein the first resistor and the second resistor have substantially the same resistance.

33. The POTS splitter of claim 24, wherein the first capacitor and the second capacitor have substantially the same capacitance and the third capacitor and the fourth capacitor have substantially the same capacitance.

34. A POTS splitter, comprising:
   a low-pass filter for coupling between an xDSL out port and a POTS port, wherein the low-pass filter comprises:
      a first differential mode inductor having a first winding and a second winding, wherein the first winding corresponds to a tip line and the second winding corresponds to a ring line;
      a second differential mode inductor in series with the first differential mode inductor and having a first winding and a second winding, wherein the first winding corresponds to the tip line and the second winding corresponds to the ring line;
      a third differential mode inductor in series with the first and second differential mode inductors and having a first winding and a second winding, wherein the first winding corresponds to the tip line and the second winding corresponds to the ring line;
      a first resistance in parallel with the first winding of the first differential mode inductor;
      a second resistance in parallel with the second winding of the first differential mode inductor;
      a first capacitance in parallel with the first winding of the second differential mode inductor;
      a second capacitance in parallel with the second winding of the second differential mode inductor;
      a third capacitance in parallel with the first winding of the third differential mode inductor;
      a fourth capacitance in parallel with the second winding of the third differential mode inductor;
      a fifth capacitance in series with a third resistance coupled between the tip line and the ring line;
      a sixth capacitance coupled between the tip line and the ring line; and
      a seventh capacitance coupled between the tip line and the ring line;
      wherein the fifth capacitance and the third resistance are interposed between the first and second differential mode inductors;
      wherein the sixth capacitance is interposed between the second and third differential mode inductors; and
      wherein the third differential mode inductor in interposed between the sixth and seventh capacitances.

35. The POTS splitter of claim 34, wherein the low-pass filter is substantially devoid of active components.

36. The POTS splitter of claim 34, further comprising:
   a third resistance in parallel with the first capacitance and the first winding of the second differential mode inductor;

a fourth resistance in parallel with the second capacitance and the second winding of the second differential mode inductor;

an eighth capacitance in parallel with the first resistance and the first winding of the first differential mode inductor;

a ninth capacitance in parallel with the second resistance and the second winding of the first differential mode inductor; and a fifth resistance in series with the fifth capacitance and coupled between the tip line and the ring line.

37. A remote-side xDSL modem, comprising:

a low-pass filter for coupling between an xDSL out port and a POTS port, wherein the low-pass filter consists essentially of:

a first differential mode inductor in series with a second differential mode inductor and a third differential mode inductor;

a first resistor in parallel with a first winding of the first differential mode inductor, wherein the first winding of the first differential mode inductor corresponds to a tip line of the xDSL out port;

a second resistor in parallel with a second winding of the first differential mode inductor, wherein the second winding of the first differential mode inductor corresponds to a ring line of the xDSL out port;

a first capacitor in parallel with a first winding of the second differential mode inductor, wherein the first winding of the second differential mode inductor corresponds to the tip line of the xDSL out port;

a second capacitor in parallel with a second winding of the second differential mode inductor, wherein the second winding of the second differential mode inductor corresponds to the ring line of the xDSL out port;

a third capacitor in parallel with a first winding of the third differential mode inductor, wherein the first winding of the third differential mode inductor corresponds to the tip line of the xDSL out port;

a fourth capacitor in parallel with a second winding of the third differential mode inductor, wherein the second winding of the third differential mode inductor corresponds to the ring line of the xDSL out port;

a first shunt leg comprising a first end coupled between the first windings of the first and second differential mode inductors and a second end coupled between the second windings of the first and second differential mode inductors;

a second shunt leg comprising a first end coupled between the first windings of the second and third differential mode inductors and a second end coupled between the second windings of the second and third differential mode inductors; and a third shunt leg comprising a first end coupled to the first winding of the third differential mode inductor and a second end coupled to the second winding of the third differential mode inductor;

wherein the third differential mode inductor is coupled between the second and third shunt legs.

38. The remote-side modem of claim 37, wherein the first shunt leg consists essentially of a fifth capacitor in series with a third resistor, the second shunt leg consists essentially of a sixth capacitor, and the third shunt leg consists essentially of a seventh capacitor.

39. The remote-side modem of claim 38, further comprising:

wherein the first inductor has an inductance value of approximately 21 mH;

wherein the second inductor has an inductance value of approximately 10 mH;

wherein the third inductor has an inductance value of approximately 2.8 mH;

wherein the first and second resistors each have a resistance value of approximately 2.37 kΩ;

wherein the third resistor has a resistance value of approximately 51.1 Ω;

wherein the first and second capacitors each have a capacitance value of approximately 0.0022 μF;

wherein the third and fourth capacitors each have a capacitance value of approximately 0.022 μF;

wherein the fifth capacitor has a capacitance value of approximately 0.022 μF;

wherein the sixth capacitor has a capacitance value of approximately 0.036 μF; and wherein the seventh capacitor has a capacitance value of approximately 0.01 μF.

40. The remote-side modem of claim 37, further comprising overvoltage and surge protection coupled between the low-pass filter and the xDSL out port.

* * * * *